US008224890B1

(12) United States Patent
Marwood et al.

(10) Patent No.: US 8,224,890 B1
(45) Date of Patent: Jul. 17, 2012

(54) REUSING DATA IN CONTENT FILES

(75) Inventors: David Marwood, San Leandro, CA (US); Stephen M. Lacy, Mountain View, CA (US); Kyle Kakligian, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1134 days.

(21) Appl. No.: 12/048,035

(22) Filed: Mar. 13, 2008

(51) Int. Cl.
G06F 15/16 (2006.01)

(52) U.S. Cl. .......................................... 709/203; 725/39

(58) Field of Classification Search .................. 709/203; 725/39
See application file for complete search history.

(56) References Cited

U.S. PATENT DOCUMENTS

| | | | | |
|---|---|---|---|---|
| 5,442,389 | A * | 8/1995 | Blahut et al. | 725/92 |
| 2002/0069218 | A1 * | 6/2002 | Sull et al. | 707/501.1 |
| 2005/0262529 | A1 * | 11/2005 | Neogi et al. | 725/31 |
| 2006/0085634 | A1 * | 4/2006 | Jain et al. | 713/156 |
| 2007/0113246 | A1 * | 5/2007 | Xiong | 725/39 |
| 2007/0162568 | A1 * | 7/2007 | Gupta et al. | 709/219 |
| 2008/0071920 | A1 * | 3/2008 | Gupta et al. | 709/231 |
| 2008/0276173 | A1 * | 11/2008 | Li et al. | 715/716 |
| 2009/0217322 | A1 * | 8/2009 | Hindle | 725/39 |

OTHER PUBLICATIONS

"Content Delivery Network", Wikipedia, the free encyclopedia [online], [retrieved on Mar. 3, 2008]. Retrieved from the Internet: URL:http://en.wikipedia.org/wiki/Content_Delivert_Network; 4 pages.
"BitTorrent—What it is", BitTorrent [online], [retrieved on Mar. 3, 2008]. Retrieved from the Internet: URL: http://support.bittorrent.com/; 2 pages.
Mogul, J., et al., "Delta encoding in HTTP," Network Working Group, Request for Comments 3229; Jan. 2002; 49 pages.

* cited by examiner

*Primary Examiner* — Thomas Dailey
(74) *Attorney, Agent, or Firm* — Sterne, Kessler, Goldstein & Fox, P.L.L.C.

(57) ABSTRACT

An embodiment for reusing data in content files includes receiving a request for a content file and retrieving a recipe that includes a series of instructions needed to compose the content file. Data identified by the recipe may then be retrieved from a content file server and the requested content file is composed based on the set of instructions in the recipe. In an example, the recipe is processed by a recipe player to compose a content file. In another embodiment, content files are stored in a cache as a series of instructions for generating them from portions of other content files. In this way, performance in a content delivery network may be improved by reusing similar data in content files.

15 Claims, 13 Drawing Sheets

REUSING DATA IN CONTENT FILES

BACKGROUND

1. Field of the Invention

The present invention relates to content delivery networks.

2. Related Art

The emergence of a vast amount of digital content stored across networks, particularly the Internet, has led to an increase in bandwidth required to transmit information.

Typically to regulate bandwidth use and to facilitate faster delivery of content, content providers utilize content delivery networks to provide content requested by users. A content delivery network (CDN) is a collection of servers coupled together, across a network such as the Internet, that cooperate to deliver content to end users.

CDNs usually host third-party content. Content may include static content (e.g. static HTML pages, images, documents, software patches etc), streaming media (e.g. audio, real time video etc) and varying content services (e.g. directory service, e-commerce service, file transfer service etc.). Sources of content include large enterprises, web service providers, media companies and news broadcasters. User clients may interact with the CDN to obtain desired content. For instance a user may specify a request for content or a service provider of content through devices such as cell phones, PDAs, laptops, desktops and other devices that can retrieve content over network(s).

CDNs try to improve network performance by distributing content to content delivery node(s) located close to users. However, as the physical size of content increases, it becomes inefficient for a content delivery node to retrieve data repeatedly from content providers. Furthermore, size of digital storage needed by a content delivery node increases.

Different methods have been proposed to reduce the bandwidth used due to fetching of redundant data. In one method, known as delta coding, a user is provided differences (known as deltas) from data that was originally provided to the user. However, at the current rate of bandwidth growth, such methods to reduce bandwidth usage may prove to be ineffective in the future. For example, in a case where the size of a 'delta' is substantially large, delays may still occur in providing data to the user. Such delays may degrade user experience.

Systems and methods are needed that improve the performance of content delivery networks.

BRIEF SUMMARY

The present invention relates to reusing data in content files. An embodiment includes receiving a request for a file and retrieving a recipe that includes a series of instructions needed to compose the file. Data identified by the recipe may then be retrieved from a content file server and the requested file is composed based on the set of instructions in the recipe. In an example, the recipe is processed by a recipe player to compose a file. In another embodiment, files are stored in a cache as a series of instructions for generating them from portions of other files.

In this way, performance in a content delivery network may be improved by reusing similar data in files.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The present invention relates to systems and methods for reusing data in content files. In embodiments of the invention, content files requested by a user are composed from a set of instructions included in recipe(s). A cache then may only store portions of content data of a file. Remaining content data for the file may be referenced according to a recipe. In this way, content data of a file or portions of a file may be stored along with recipe(s) which may include instructions for generating a file.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "content file" refers to any file with content or a portion of content, including, but not limited to, text, audio, video, graphics or other content. Any file format may be used.

The term "content delivery node" used herein refers to a server that may be present as a part of a content delivery network. A content delivery node may communicate with a client over a network.

The term "byte" used herein refers generally to a portion of data, such as, number of bits of data, and is not intended to be limited to a value or size.

This detailed description of the embodiments of the present invention is divided into several sections as shown by the following table of contents.

Table of Contents
1. System
2. Recipe Based Content Delivery Node
   2.1 Bootstrap Identifier Generator
   2.2 Recipe Player
   2.3 Caching and Reusing Data in Content Files
3. Recipe Generator
   3.1 Identity Verifier
   3.2 Byte Generator
   3.3 Byte Offset Generation
4. Recipe Expiration and Data Discard Time
5. Recipe Continuations
6. Identity Verification
7. Selective Retrieval of Audio and Video Data
8. Conclusion

1. System

Figure 1:
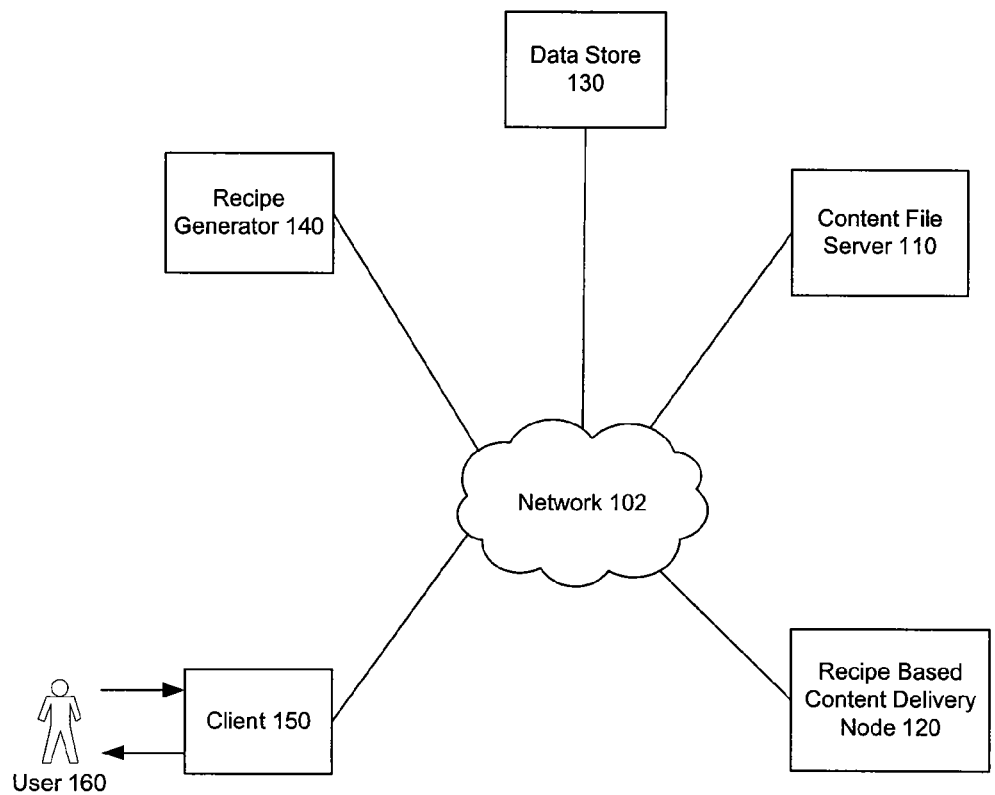
FIG. 1 is an architecture diagram of a system for reusing data in content files according to an embodiment of the invention.

This section describes a system for reusing data in content files according to an embodiment of the invention illustrated in FIG. 1. FIG. 1 is an architecture diagram of a system 100 for reusing data in content files.

System 100 includes network 102, content file server 110, recipe based content delivery node 120, data store 130, recipe generator 140, client 150 and user 160 that may interact with client 150.

Network 102 can be any type of network or combination of networks such as a local area network, wide area network or the Internet. Network 102 may be a form of a wired network or a wireless network. Network 102 may allow content file server 110, recipe based content delivery node 120, data store 130, recipe generator 140, client 150 to communicate with each other.

Content file server 110 may be a server which stores one or more content files or portions of content files. Content file server 110 may accept requests from recipe based content delivery node 120 and may provide data identified by a request. Content file server 110 may transmit and receive data over network 102.

Recipe based content delivery node 120 may receive a request from client 150 over network 102. A request from client 150 received by recipe based content delivery node 120 may include a request for a content file. A content file refers to any file with content, including, but not limited to, text, audio, video, graphics or other content. Furthermore, any file format may be used for the content file. Recipe based content delivery node 120 may deliver data in response to the request from client 150. An embodiment of recipe based content delivery node 120 is described in detail further in the description.

Data store 130 may store data related to content files that are requested by client 150. Content file server 110 may retrieve data from data store 130. In an embodiment, data store 130 may provide data to content file server 110 that may not be present in content file server 110. As an example, not intended to limit the invention, data store 130 may receive content from a content provider (not shown). Content providers may include, but are not limited to, enterprises, web service providers, media companies and news broadcasters.

Client 150 can be any type of client, including any type of computer (e.g., desktop computer, workstation, notebook, mainframe, terminal, set-top box etc.), handheld device (personal digital assistant, mobile phone, etc.), or the like. Client device 150 need only have the capability to communicate over a network (e.g. Internet, telephony, LAN, WAN, or combination thereof). Client 150 may also have a user interface. A client device 150 may support a content retrieval mechanism and the appropriate networking applications and components, all of which are known to those skilled in the art. A content retrieval mechanism may allow the client 150 to download or stream content. Content may then be used by user 160.

Recipe generator 140 generates recipes in an embodiment of the invention. A recipe may include a series of instructions that may be used to compose a content file. The series of instructions in a recipe may reference one or more portions of data needed to compose a content file or may contain bytes needed to compose a content file. A content file may be composed from data present in content file server 110. In another embodiment, a content file may be composed using data present in a cache of recipe based content delivery node 120. In still another embodiment, a content file may be composed using data present in a cache of recipe based content delivery node 120 and/or data present in content file server 110 or data in data store 130. Recipe generator 140 may generate a recipe in response to a request from recipe based content delivery node 120. In this way, content files that may be requested by a user 160 through client 150 may be retrieved after composing them using recipes.

Note that while several servers and services are illustrated separately in FIG. 1, some can be combined in alternative embodiments of the invention. Data store 130 and content file server 110 may be implemented on the same machine, for example. Other entities in FIG. 1 may likewise be consolidated depending upon a particular application or design.

Figure 2:
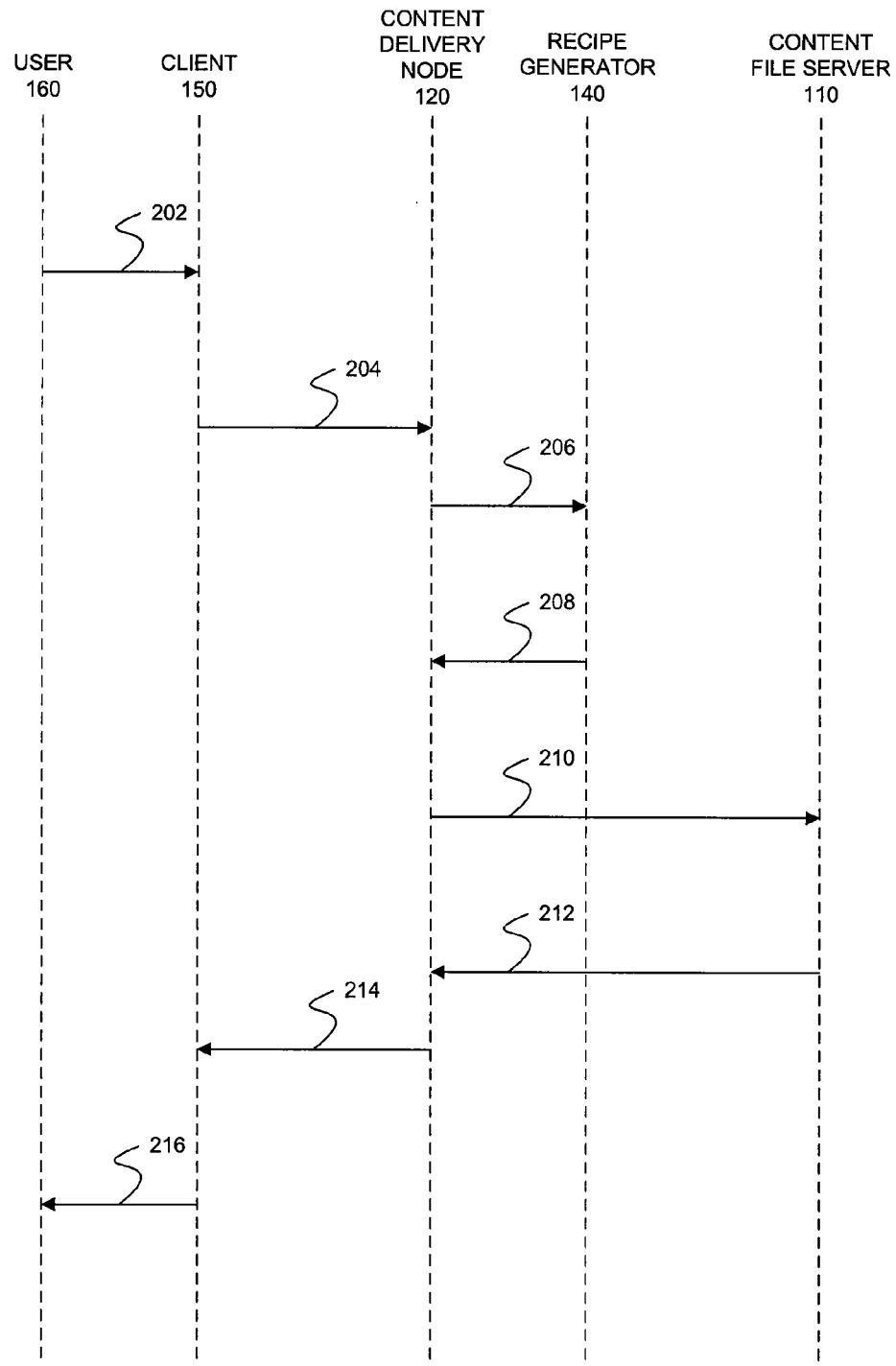
FIG. 2 is a flow diagram illustrating various stages in the operation of an embodiment of the invention.

The overall interaction between user 160, client 150, recipe based content delivery node 120, recipe generator 140 and content file server 110 in an exemplary embodiment can be illustrated by flow diagram 200 in FIG. 2.

In flow diagram 200, user 160 provides a request to client 150 for a content file (step 202). Client 150 sends a request for the content file to recipe based content delivery node 120 (step 204). Recipe based content delivery node 120 provides a recipe request to recipe generator 140 (step 206). Recipe generator 140 provides a recipe to recipe based content delivery node 120 in response to the request of step 206 (step 208). Recipe based content delivery node 120 provides a request for data to content file server 110. The data may be referenced by the recipe provided to recipe based content delivery node 120 in step 208 (step 210). Content file server 110 provides the data requested in step 410 to recipe based content delivery node 120 (step 212). Recipe based content delivery node 120 provides the composed content file to client 150 (step 214). As an example, the content file may be composed using data provided by content file server 110 in step 212. User 160 is then provided with the content file received by client 150 in step 214 (step 216) to fulfill the user's original request of step 202.

In this way, content files requested by user 160 are composed based on recipe(s) retrieved by recipe based content delivery node 120. This allows recipe based content delivery node 120 to store less data and still fulfill requests for content file(s) over a network 120. For instance, recipe based content delivery node 120 can store only a portion of content data in cache 330 (which can be reused easily) and then access remaining content data according to a recipe. This is even more efficient for certain types of content files where some of the content is substantially similar. In a further example, this also allows recipe based content delivery node 120 to stream data according to a recipe which minimizes demand or amount of data cached at recipe based content delivery node 120 even further. By using a recipe and caching some content file data at recipe based content delivery node 120, work performed by the content file server 110 can be reduced. This is especially helpful in many cases where multiple users are accessing the same content file over a network (such as, a content file available at YouTube or Google Video provided by Google Inc.) This is helpful to when requests are made for content files with substantially similar data, for instance when a user requests to view a content file beginning at different times or in different languages. When a content file, such as, a video clip, is viewed at different start times the content may be substantially similar and cached data may be reused with a proper recipe. Similarly, with different languages, content is substantially similar and cached data may be reused. For instance the video portion may be accessed from a cache and an audio track in a different language than cached may be obtained from content file server 110 with a proper recipe. These examples are not intended to limit the present invention.

Recipe based content delivery node 120, and its various operations, are described in detail in the next section.

2. Recipe Based Content Delivery Node

Figure 3:
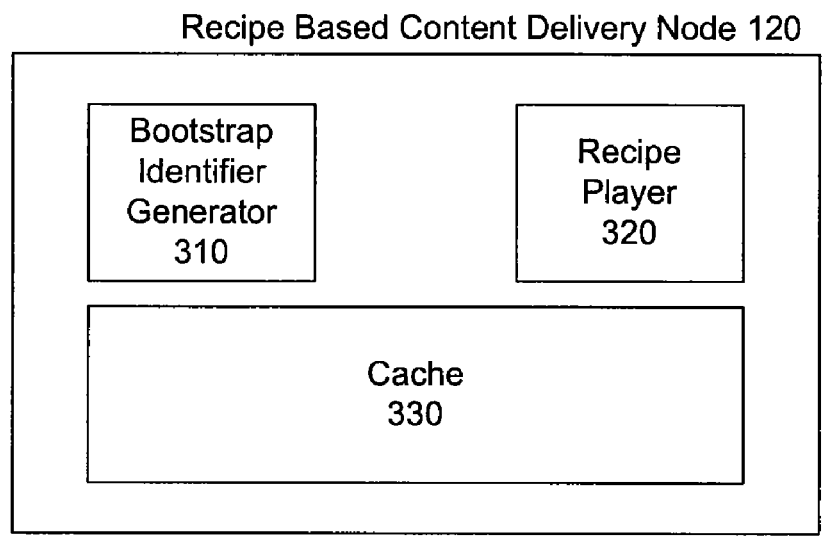
FIG. 3 is a diagram illustrating a recipe based content delivery node according to an embodiment of the invention.

FIG. 3 illustrates an architecture diagram of recipe based content delivery node 120 in an embodiment of the invention.

In an embodiment, recipe based content delivery node 120 comprises a bootstrap identifier generator 310, recipe player 320 and cache 330.

2.1 Bootstrap Identifier Generator

A recipe may be retrieved by recipe based content delivery node 120 in response to a request from client 150. In response to such a request, bootstrap identifier generator 310 generates a bootstrap identifier that may be used to retrieve a recipe from recipe generator 140. A recipe may be identified by a bootstrap identifier. As an example, not intended to limit the invention, a bootstrap identifier may be a uniform resource locator (URL).

In an embodiment, bootstrap identifier generator 310 may receive a request from client 150 that includes a form of a content identifier. Bootstrap identifier generator 310 may then convert the content identifier received from client 150 into a bootstrap identifier.

A recipe that has been identified by a bootstrap identifier may be used by recipe player 320 to compose a content file in an embodiment of the invention.

2.2 Recipe Player

In an embodiment, recipe player 320 composes a content file based on a recipe. As an example, recipe player 320 may retrieve data referenced by a recipe from content file server 110 to compose the content file. A content file that has been composed may be provided to user 160 by client 150.

Figure 4A:
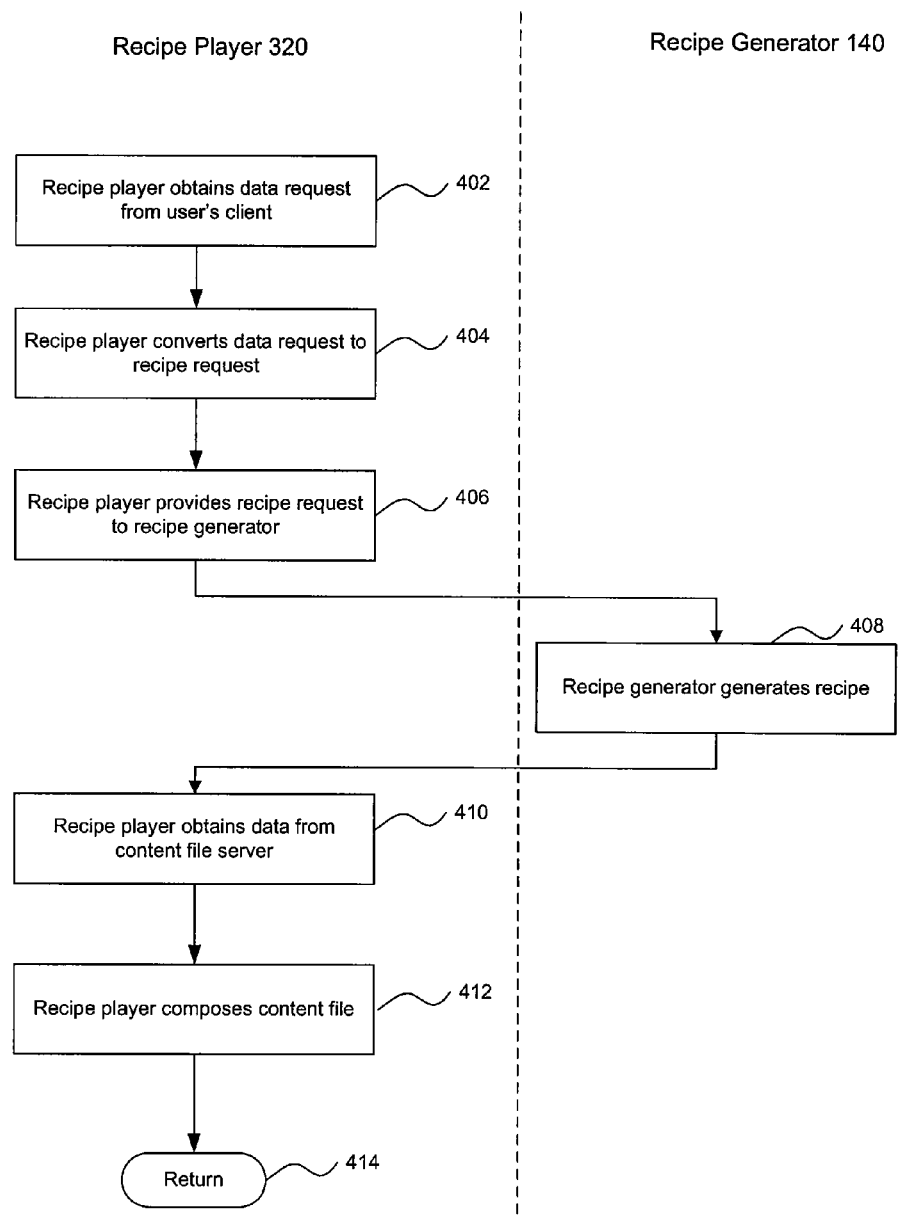
FIG. 4A is a flowchart various stages involved in composing a file according to an embodiment of the invention.

FIG. 4A is a flowchart illustrating the overall operation of a recipe player 320 in an embodiment of the invention.

Method 400 begins with recipe player 320 obtaining a request for data from a client 150 (step 402). Recipe player 320 then converts the data request to a recipe request (step 404). In an embodiment, recipe player 320 converts the data request to a recipe request using bootstrap identifier generator 310. Recipe player 320 then provides the recipe request to recipe generator 140 (step 406). Recipe generator 140 may then generate the recipe in response to the request of step 406 (step 408). Recipe player 320 then obtains data from content file server 110 based on the recipe generated in step 408 (step 410). Recipe player 320 composes a content file based on the recipe and data retrieved in step 410 and method 400 returns (step 414).

In this way, recipe player 320 composes a content file based on a recipe retrieved from recipe generator 140.

Figure 4B:
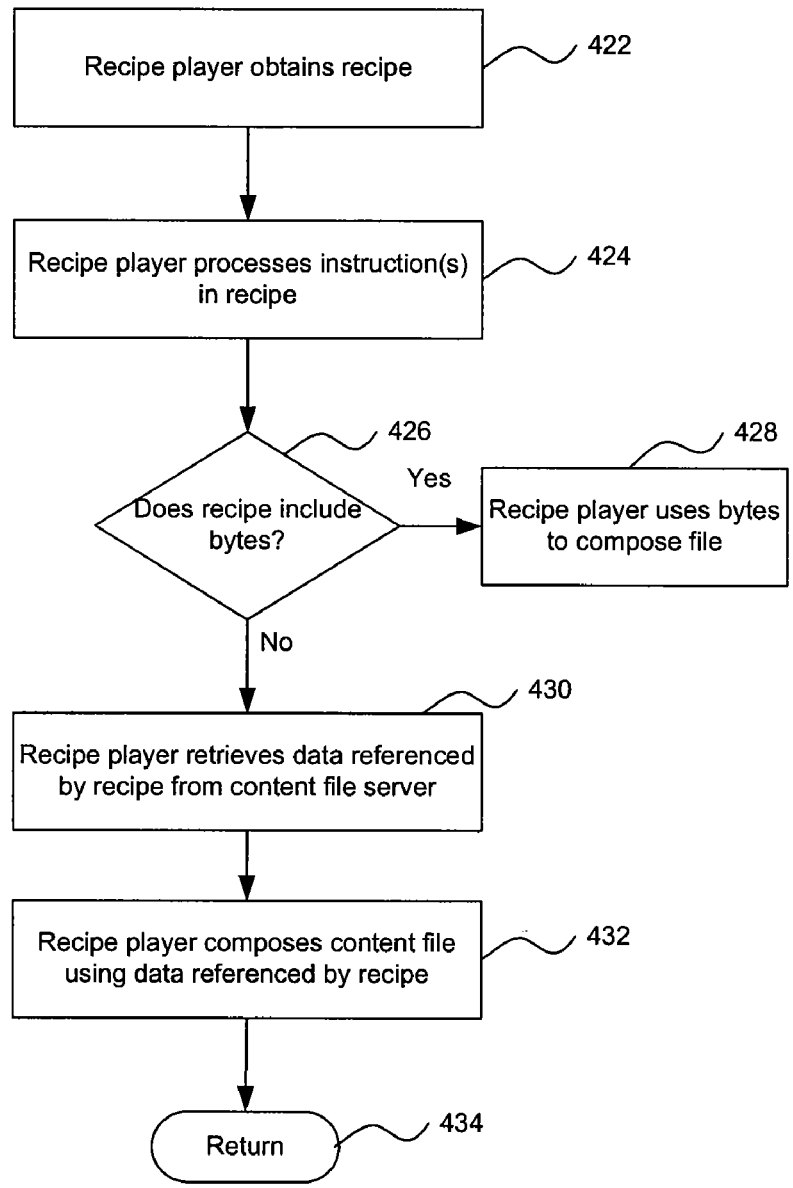
FIG. 4B is a flowchart illustrating various stages in the processing of a recipe by a recipe player in an embodiment of the invention.

FIG. 4B is a flowchart illustrating processing of one or more instructions that may be included in a recipe in an embodiment of the invention.

Method 420 begins with recipe player 320 obtaining a recipe from recipe generator 140 (step 422). Recipe player 320 then processes the instruction(s) in the recipe that may be needed to compose a content file (step 424). In an embodiment, instruction(s) in a recipe may include content bytes. Content bytes, for example, may include a header information or byte(s) that may be needed to compose a content file. In another embodiment, instructions may include one or more references to a content byte or a range of content bytes. Recipe player 320 then checks if the recipe includes one or more content bytes (step 426). If the recipe includes one or more content bytes, recipe player 320 may use at least the content bytes to compose a content file (step 428). If the recipe does not include content bytes (step 426) recipe player 320 retrieves data that may be referenced by the recipe from content file server 110 (step 430). Recipe player 320 then composes a content file using at least the data referenced by the recipe (step 432) and method 420 returns (step 434).

In this way, recipe player 320 processes instructions in a recipe retrieved from recipe generator 140.

Figure 12A:
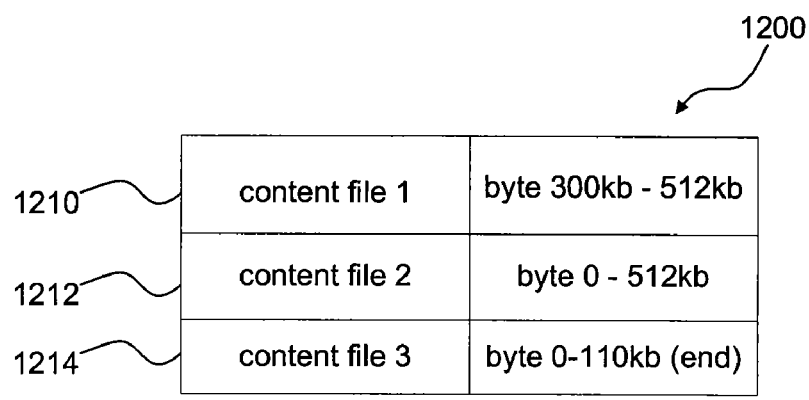
FIG. 12A and FIG. 12B are diagrams illustrating exemplary recipes according to an embodiment of the invention.
Figure 12B:
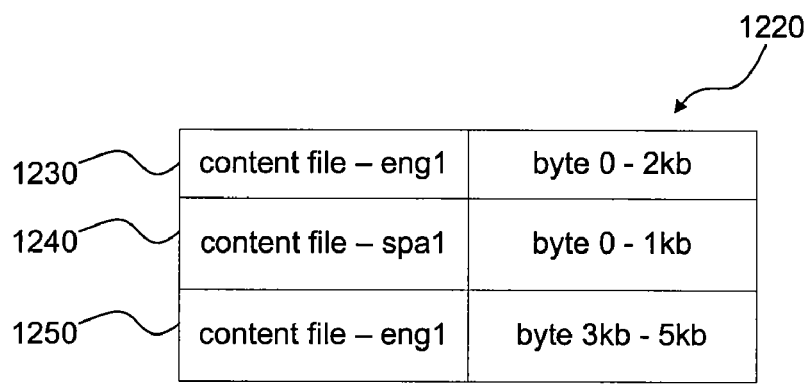

FIGS. 12A-B illustrate exemplary recipes that may be processed by recipe player 320 using method 420 in an embodiment of the invention.

FIG. 12A illustrates recipe 1200. Recipe 1200 is an exemplary recipe comprising rows 1210 through 1214. Each row 1210 through 1214 includes a content file name and a byte offset range. For example, row 1210 includes content file 1 and byte offset range 300 k-512 k. Row 1212 includes content file 2 and byte offset range 0-512 k and row 1214 includes content file 3 and byte offset range 0-110 k. For example, when recipe player 320 processes recipe 1200 using method 420, it uses bytes in a range of 300 k-500 k from content file 1, bytes in a range of 0-512 k from content file 2 and bytes in a range of 0-110 k from content file 3, where content files 1 through 3 are retrieved from content file server 110. In an embodiment, recipe player 320 then composes a content file using one or more bytes referenced by recipe 1200 in content files 1, 2 and 3.

FIG. 12B illustrates recipe 1220. Recipe 1220 is another exemplary recipe comprising rows 1230 through 1250. Each row from 1230 through 1250 includes a content file name and a byte offset range. For example, row 1230 includes content file name 'eng1' and a byte offset range of 0-1 kb. Row 1240 includes content file name 'spa1' and a byte offset range of 0-2 kb. Row 1250 comprises content file name 'eng1' and a byte range of 3-5 kb.

For example, when recipe player 320 processes recipe 1220 using method 420, it uses bytes in a range of 0-2 k from content file 'eng1', bytes in a range of 0-1 k from content file 'spa1' and bytes in a range of 3 k-5 k from content file 'eng1' where content files 'eng1' and 'spa1' are retrieved from content file server 110. In an embodiment, recipe player 320 then composes a content file using one or more bytes referenced by recipe 1200 in content files 'eng1' and 'spa1.'

The recipes illustrated in FIGS. 12A-B are exemplary and are not intended to limit the invention.

2.3 Caching and Reusing Data in Content Files

In an embodiment, cache 330 may be used to store data that is retrieved from content file server 110 in order to compose a content file. In another embodiment, cache 330 may store data that has a higher frequency of being referenced by recipe(s) as compared to other recipe(s). In still another embodiment, cache 330 may cache recipe(s) that have been retrieved or used by recipe player 330.

Data present in cache 330 may be reused to compose a content file based on a recipe. As an example, not intended to limit the invention, if a recipe references a portion of data that may be present in cache 330, the portion of data need not be retrieved again from content file server 110. This can reduce the burden on content file server 110. Such a portion of data may be present in cache 330 as it may be a part of a content file referenced by a recipe in an earlier request from client 150.

In this way, reuse of data in content files may also reduce latency in delivering content to user 160 through client 150.

Figure 5:
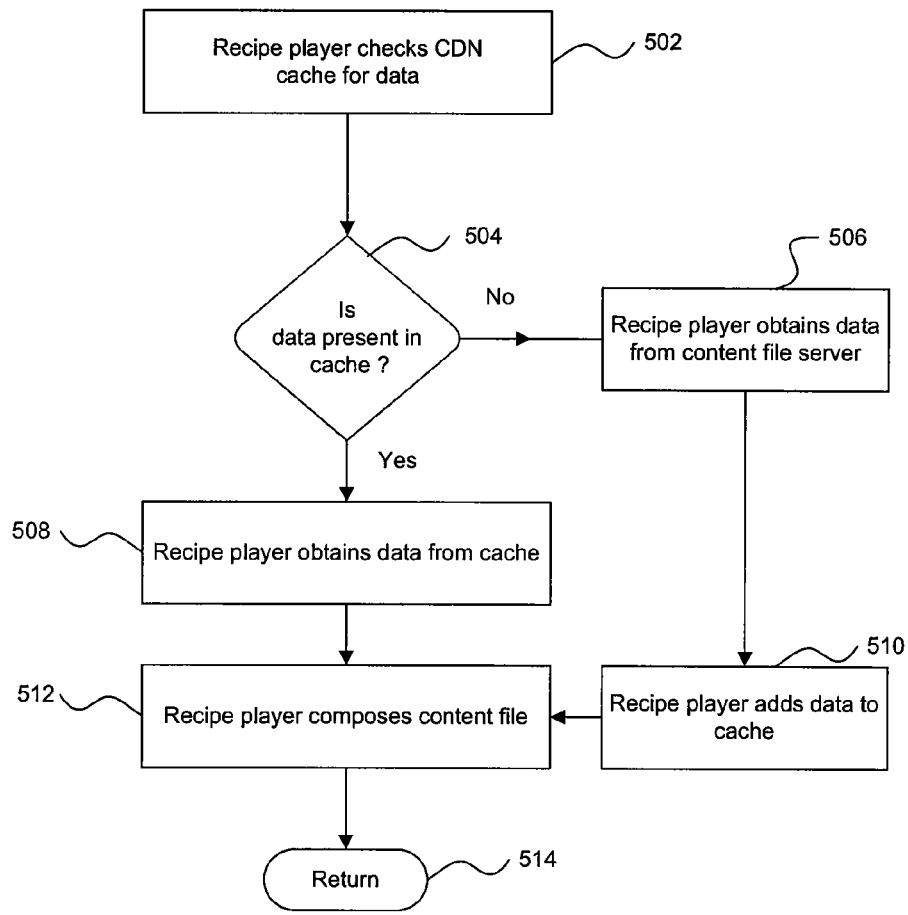
FIG. 5 is a flowchart illustrating various stages involved in checking a cache for data according to an embodiment of the invention.

FIG. 5 is a flowchart illustrating recipe player 320 checking cache 330 for data in an embodiment of the invention.

Recipe player 320 checks cache 330 for data (step 502). The data, for example, may be referenced by a recipe being processed by recipe player 320. If data referenced by the recipe is found to be present in cache 330 (step 504), recipe player 320 obtains the data from cache 330 (step 508) and recipe player composes a content file using at least the data obtained in step 508 (step 512). If data referenced by the recipe is not found to be present in cache 330 (step 504), recipe player 320 obtains the data referenced by recipe from content file server 110 (step 506) and recipe player 320 may optionally add data obtained in step 506 to the cache (step 510). Recipe player 320 then composes the content file using data obtained in step 506 and/or step 508 (step 512) and method 500 returns (step 514).

In this way, recipe player 320 checks cache 330 for data needed to compose a content file based on a recipe. Furthermore, data referenced by a recipe but present in cache 330 need not be retrieved again from cache server 110 and can be reused from cache 330.

In an embodiment, recipe player 320 checks if cache 330 is completely occupied with data or is full. If cache 330 is full, recipe player 320 may delay requests for data from content file server 110 or recipes from recipe generator 140. As an example, requests for data from content file server 110 or recipes from recipe generator 140 may be delayed until cache 330 begins to empty so as to avoid consuming bandwidth and computation resources of recipe generator 140 to generate data that may not be sent to recipe player 320.

3. Recipe Generator

Figure 6:
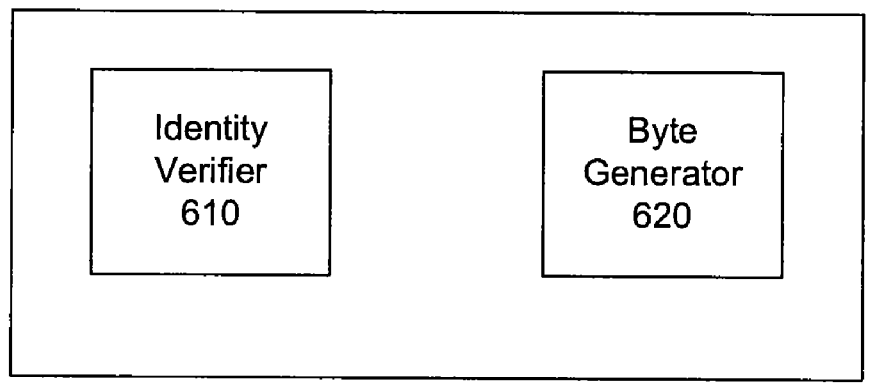
FIG. 6 is a diagram illustrating a recipe generator in an embodiment of the invention.

FIG. 6 illustrates the architecture diagram of recipe generator 140 in an embodiment of the invention.

Recipe generator 140 may provide a recipe to recipe based content delivery node 120 in response to a request from recipe based content delivery node 120. As an example, such a request may be generated by bootstrap identifier generator 310 or recipe player 320. In an embodiment, recipe generator 140 comprises a identity verifier 610 and a byte generator 620.

3.1 Identity Verifier

Identity verifier 610 may verify the authenticity of a request from recipe based content delivery node 120. In an embodiment, identity verifier checks the IP address of the requestor or a recipe. As an example, the requestor may include recipe player 320. Identity verification using identity verifier 610 is explained in detail further in the description.

3.2 Byte Generator

Byte generator 620 may calculate a recipe composed of references to content files from one or more prior requests as well as content byte(s) that may not appear in prior requested content files. Content byte(s) that may be generated by byte generator 620 may be placed in a recipe by recipe generator 140.

3.3 Byte Offset Generation

In an embodiment, recipe generator 140 may receive a time value from client 150 and convert it into a corresponding byte offset. As an example, a time value may be associated with the playback of a video or an audio file. A user, for example, may decide to resume viewing a video ten minutes after it begins. The time value in this exemplary case may be ten minutes. Such a time value may be received by recipe generator 140.

Figure 7:
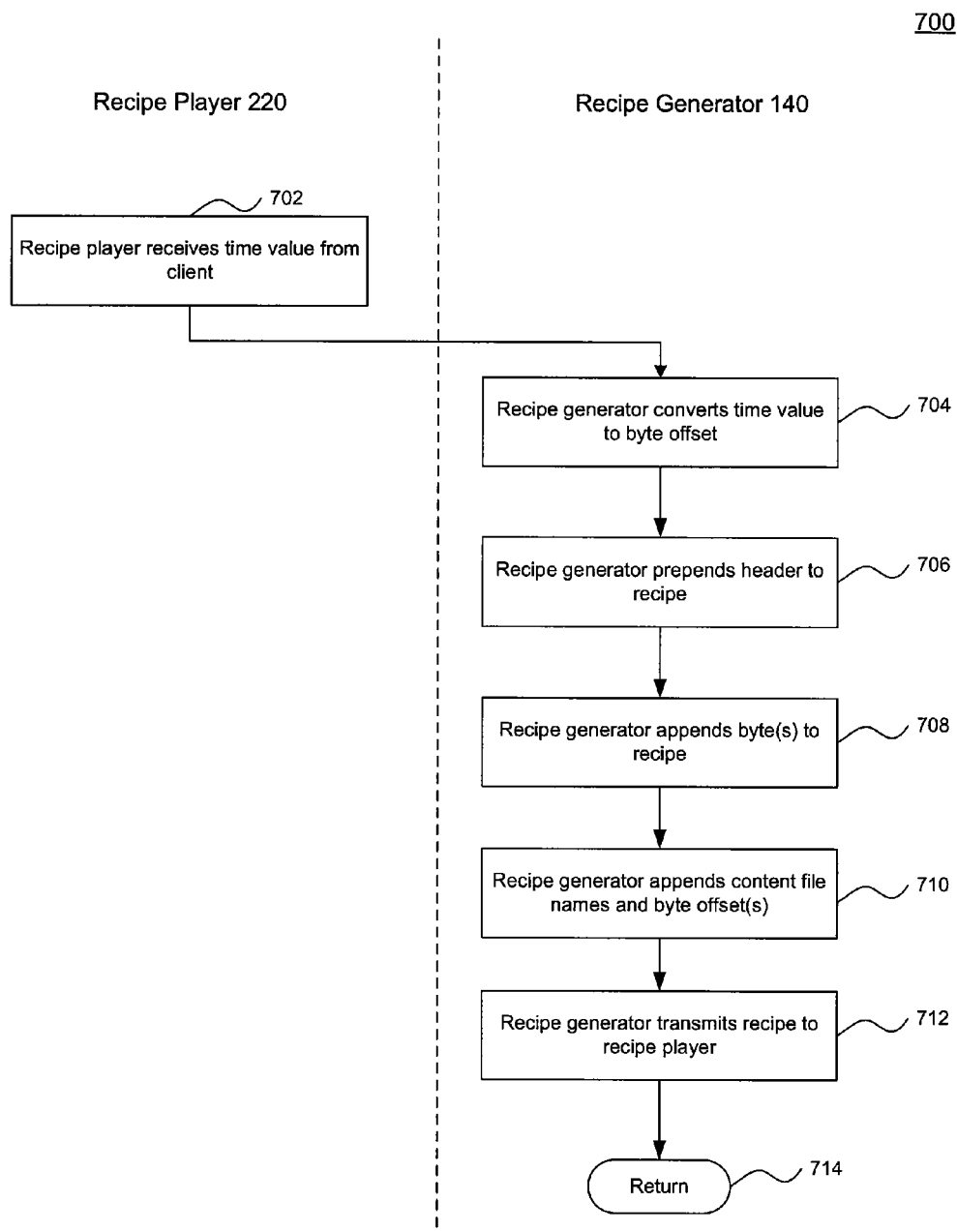
FIG. 7 is a flowchart illustrating various stages involved in generation of a recipe that includes byte offset(s) according to an embodiment of the invention.

FIG. 7 is a flowchart illustrating the generation of recipe that includes byte offset(s) in an embodiment of the invention. FIG. 7 will also be described with reference to an example recipe in FIG. 12.

Recipe player 320 receives a time value from a client 150 (step 702). As an example, such a time value may correspond to the time at which user 160 wants to resume playback of a multimedia file. Recipe generator 140 converts the time value received in step 702 into a byte offset (step 704). Recipe generator 140 may then prepend a header to a recipe (step 706). The header may contain information relating to the resolution, size and type of the multimedia file. Recipe generator 140 then appends data bytes to the recipe (step 708). Data bytes(s), for example, may be generated by byte generator 620 and may include bytes of data that are not common to one or more content files or recipes. Content file names and byte offset(s) are appended to the recipe (step 710). In an embodiment, byte generator 620 may append the content file names and data byte(s). Content file name(s) may be identifiers used to identify byte(s) of data retrieved from content file server 110. Recipe generator 140 then transmits the recipe to the recipe player 320 (step 712) and method 700 returns (step 714).

In this way, byte offsets and data byte(s) are generated and appended to a recipe by recipe generator 140 in an embodiment of the invention.

FIG. 12A illustrates an exemplary recipe 1200 that may be generated by recipe generator 140 using method 700 in an embodiment of the invention. Recipe 1200 comprises rows 1210 through 1214. Each row comprises a content file name and a byte offset. As an example row 1210 comprises content file 1 and byte offset(s) having a range 300 k to 512 k. Such byte offsets for example may be generated by recipe generator 140 using time values obtained from a user client 150 as illustrated by method 700 in FIG. 7.

4. Recipe Expiration and Data Discard Time

A recipe may have an expiry time after which recipe player 320 may discard the recipe. Furthermore, recipe generator 140 selects a data discard time at which it will discard data that may be referenced by a recipe. In an embodiment, recipe generator 140 may generate a value of expiry time for a recipe based on the data discard time. The time at which a recipe expires may be less than a value of data discard time.

In an embodiment, recipe player 320 may not start composing a content file based on a recipe after a value of expiry time for the recipe has elapsed. Furthermore, recipe generator 140 should be able to provide data referenced by a recipe until at least the data discard time.

Figure 8:
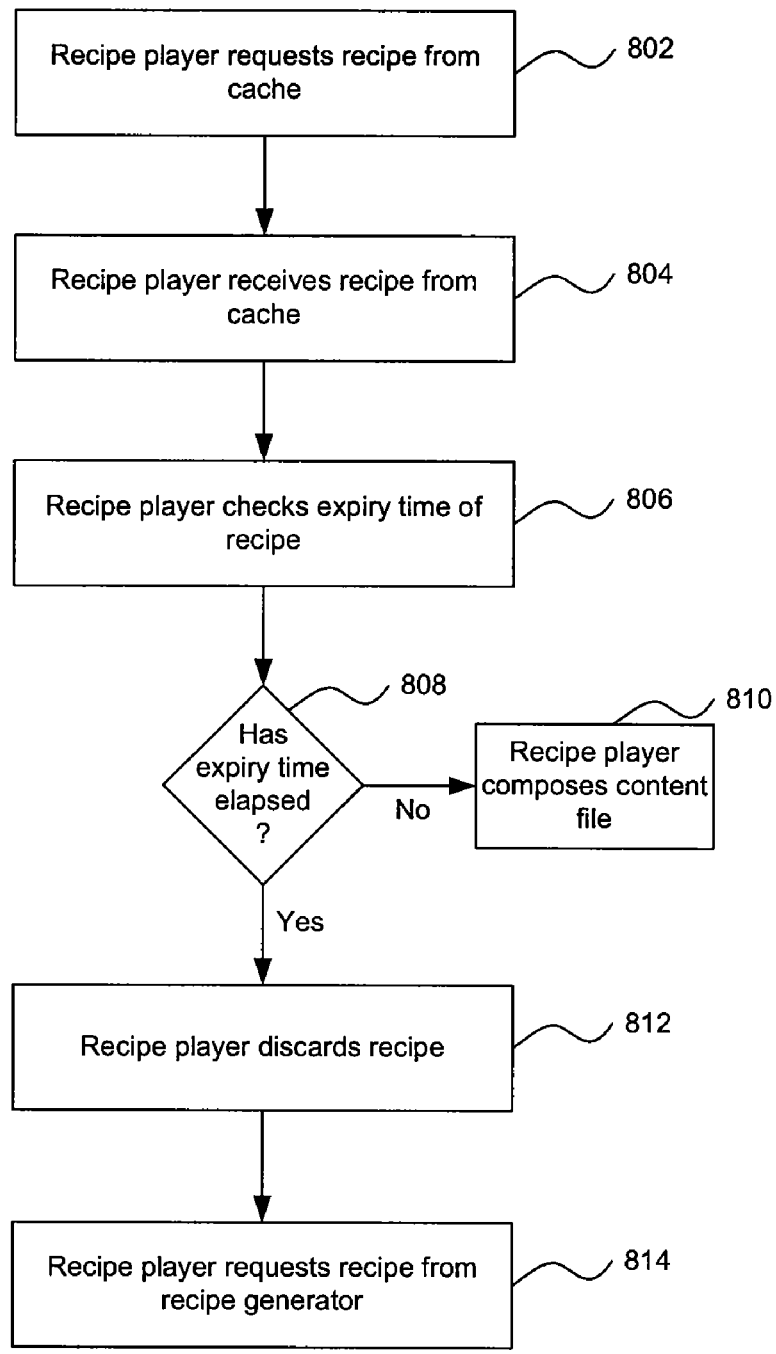
FIG. 8 is a flowchart illustrating various stages involved in composing file(s) using recipes based on their expiry time according to an embodiment of the invention.

FIG. 8 is a flowchart illustrating method 800 for composing content files based recipe(s) that may be stored in cache 330 based on their expiry time, according to an embodiment of the invention.

Method 800 begins with recipe player 320 requesting a recipe from cache 330 (step 802). Recipe player 320 receives the recipe requested in step 802 (step 804). Recipe player 320 then checks the expiry time of the recipe (step 806). If the expiry time of the recipe had elapsed (step 808) recipe player 320 discards the recipe (step 812) and recipe player requests the recipe from recipe generator 140 (step 814). If the expiry time has not elapsed (step 808), recipe player 320 composes a content file based on the recipe (step 810).

In this way, recipe player 320 composes a content file using recipe(s) that may be stored in cache 330.

5. Recipe Continuations

In an embodiment, when recipe player 320 requests a recipe from recipe generator 140, if a first byte of data of a composed content file is provided to client 150 much sooner than later bytes of data are computed, then recipe generator 140 may provide a recipe to recipe player 320 progressively by using recipe continuations.

Recipe continuations may themselves be recipes. Recipe continuations may allow recipe generator to transmit a first part of a recipe and indicate to recipe player 320 that the recipe is continued. Recipe player 320 may then request the continuation of the recipe.

Figure 9:
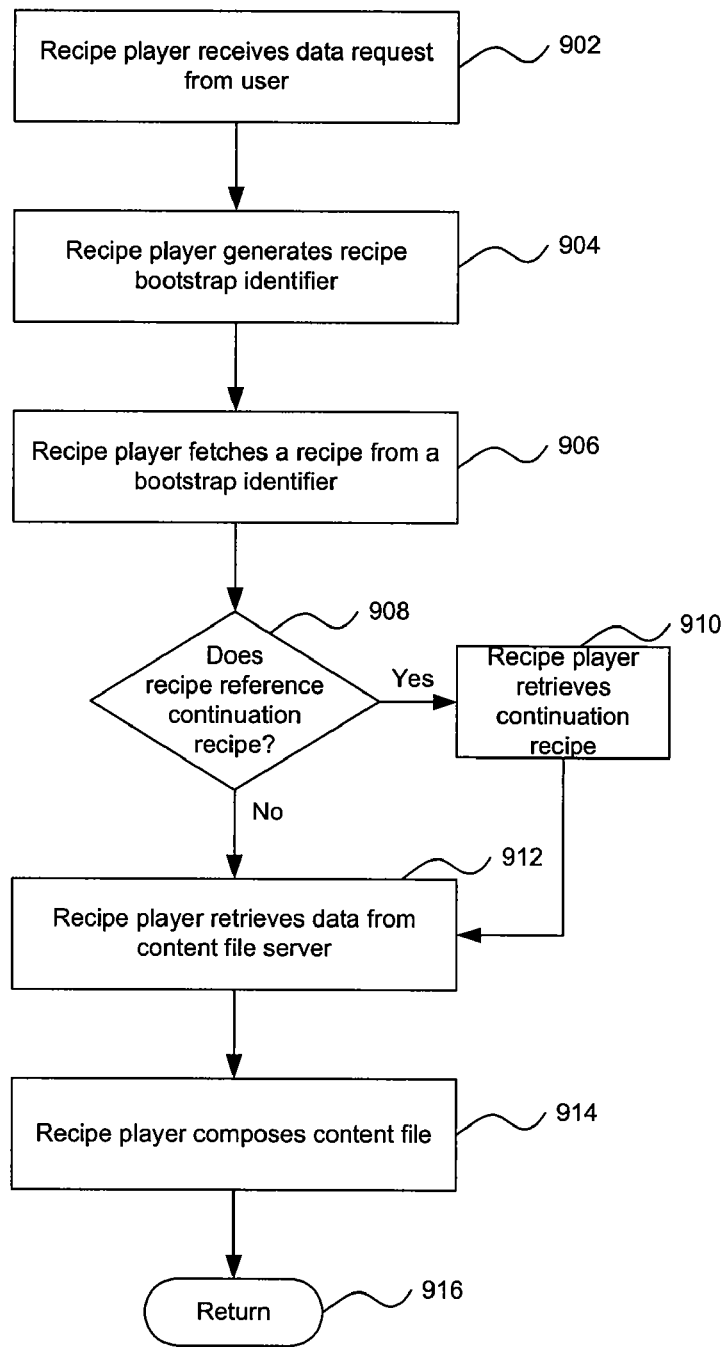
FIG. 9 is a flowchart illustrating various stage involved in retrieving a recipe continuation according to an embodiment of the invention.

FIG. 9 illustrates method 900. In an embodiment, method 900 may be used to retrieve and compose content files based on recipe continuations.

Method 900 begins with recipe player 320 receiving a request for data from client 150 (step 902). Boot strap identifier generator 310 generates a boot strap identifier based on the request of step 902 (step 904). Recipe player 320 retrieves a recipe from a location identified by the bootstrap identifier (step 906). Recipe generator 140 then checks if the recipe retrieved in step 906 references a continuation recipe (step 908).

If the recipe references a continuation recipe, recipe player retrieves a continuation recipe (step 910) and recipe player 320 retrieves data from content file server 110 based on the continuation recipe (step 912). Recipe player 320 then composes a content file based on a recipe (step 914) and method 900 returns (step 916)

If the recipe does not reference a continuation recipe, recipe player 320 retrieves data from content file server 110 based on the recipe. Recipe player 320 then composes a content file based on a recipe retrieved in step 906 (step 914) and method 900 returns (step 916).

In this way, recipe player 320 retrieves and composes content files based on recipe continuations.

6. Identity Verification

In an embodiment, recipe generator 140 verifies the identity of recipe player 320 before providing a recipe to recipe player 320. As an example, recipe generator 140 may verify the IP address of recipe player 320 after recipe player 320 has made a request for a recipe.

Figure 10:
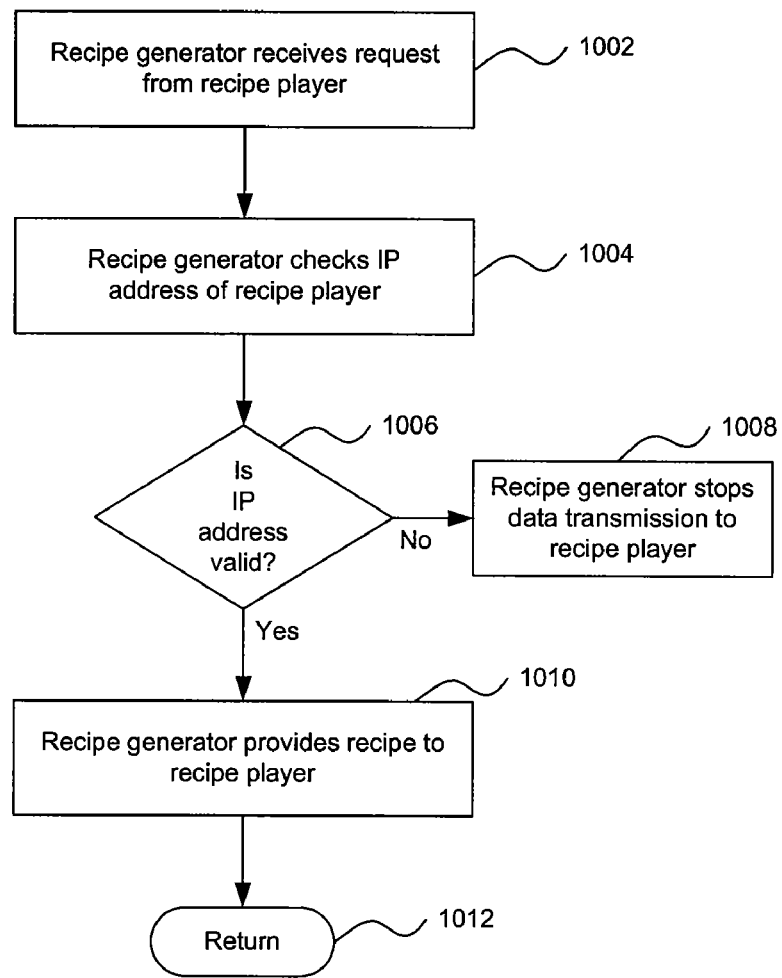
FIG. 10 is a flowchart illustrating various stages involved in IP address verification by a recipe generator in an embodiment of the invention.

FIG. 10 illustrates method 1000 that may be used to verify the identity of recipe player 320 in an embodiment of the invention.

Method 1000 begins with recipe generator 140 receiving a request for a recipe from recipe player 320 (step 1002). Recipe generator 140 then checks the IP address of recipe player (step 1004). In an embodiment, an IP address is considered to be valid if it is present on a list of IP address(es) of known recipe based content delivery node(s) 120. Such a list of valid IP address(es) may be present in recipe generator 140. If the IP address is valid (step 1006) recipe generator 140 provides a recipe to the recipe player (step 1010) and method 1000 returns (step 1012). If the IP address of recipe player is invalid (step 1006), recipe generator 140 stops data transmission to recipe player 320 (step 1008).

In this way, recipe generator 140 checks the validity of recipe player 140 before providing a recipe which may reference data from content file server 110.

7. Selective Retrieval of Different Portions of Content Files

For exemplary purposes consider that user 160 requests a video file containing speech in the English language from a content provider. In an embodiment, recipe player 320 may then compose the content file and provide the video file in the English language to user 160 through client 150. Furthermore, recipe based content delivery node 120 may cache the data needed by the video file in cache 330.

After viewing the video in the English language, user 160 or any other user may decide to view the same video in the Spanish language. Since the video is the same, but in a different language, video data in the English and Spanish video files may be considered to be substantially similar. Furthermore since video data has been stored in cache 330, the video data can be reused and need not be retrieved again from cache 330 by recipe player 320. However, since audio data has changed, it may need to be retrieved from content file server 110.

Figure 11:
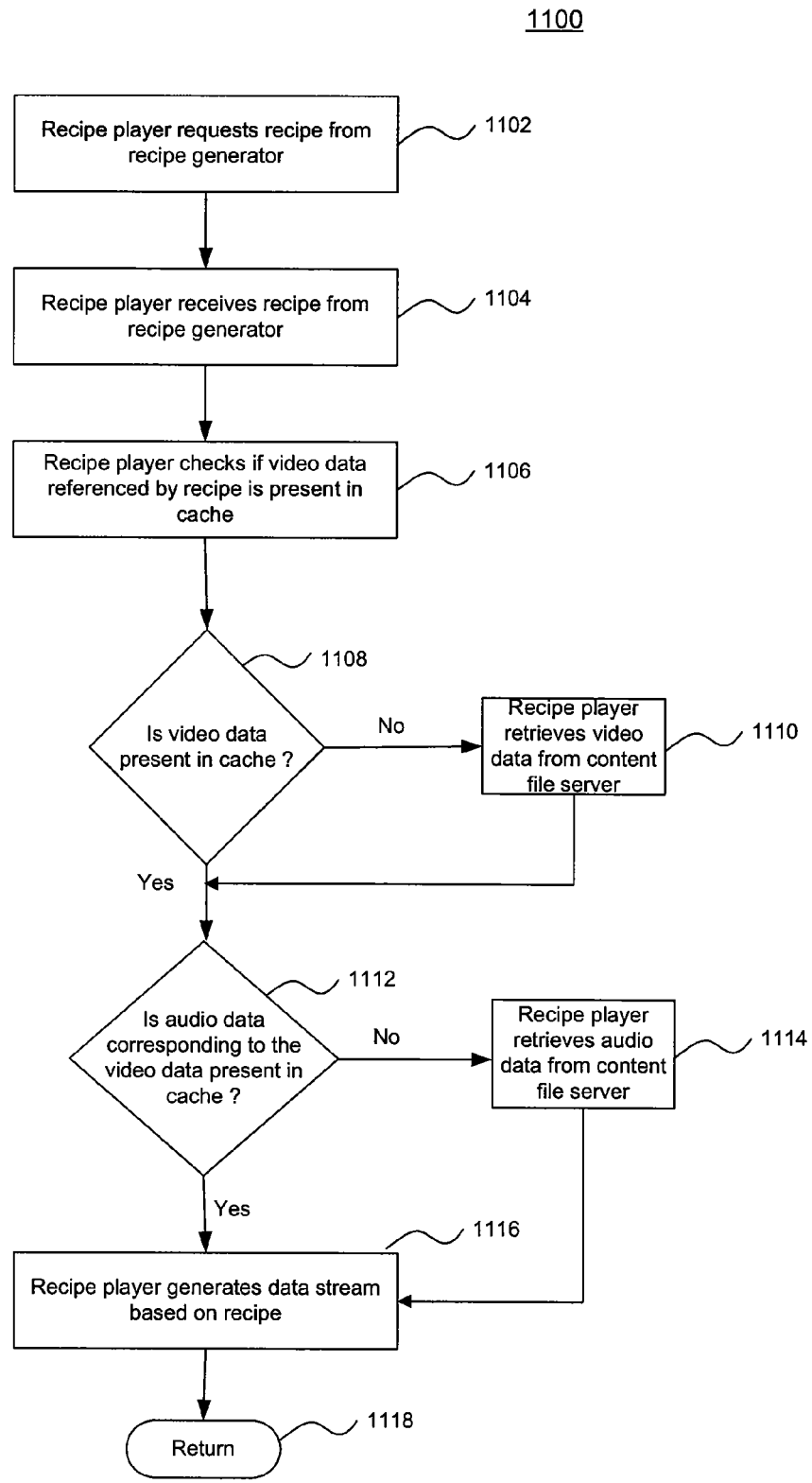
FIG. 11 is a flowchart illustrating an exemplary method according to an embodiment of the invention.

FIG. 11 illustrates method 1100 that may be used to selectively retrieve audio or video data in an embodiment of the invention. Method 1100 begins with recipe player 320 requesting a recipe from recipe generator 140 (step 1102).

Recipe player 320 receives the recipe requested in step 1102 (step 1104). For example, recipe player 320 retrieves recipe 1220 as illustrated in FIG. 12B.

Recipe player 320 checks if video data referenced by the recipe 1220 is present in cache 330 (step 1106). For example, recipe player 320 may check if data corresponding to a byte offset range of 0-2 kb from content file 'eng1' (as shown in row 1230 of FIG. 12B) is present in cache 330.

If video data referenced by the recipe 1220 is present in cache 330, method 1100 proceeds to step 1112. If video data referenced by the recipe 1220 is not present in cache 330, recipe player 320 retrieves video data from content file server 110 (step 1110) and method 1100 proceeds to step 1112. For example, recipe player 320 may retrieve an byte offset range of 0-2 kb from content file 'eng1' (as shown in row 1230 of FIG. 12B) form content file server 110 and then proceed to step 1112.

Recipe player 320 checks if the audio data corresponding to the video data is present in cache 330 (step 1112). For example, recipe player 320 may check if a byte offset range of 0-1 k from content file 'spa1'(as shown in row 1240 of FIG. 12B) is present in cache 330.

If audio data corresponding to the video data is not present in cache 330, recipe player 320 retrieves audio data from content file server (step 1114) and method 1100 proceeds to step 1116. For example, recipe player 320 may retrieve data corresponding to a byte offset range of 0-1 k from content file 'spa1' and then proceed to step 1116.

If audio data corresponding to the video data is present in cache 330, recipe player 320 composes a content file based on the data and the recipe (step 1116) and method 1100 returns (step 1118). In this way, by following the recipe, video data in cache 330 is efficiently re-used and need not be retrieved multiple times by content file server 110. This reduces work done on content file server 110 and can be helpful in environments where videos are accessed frequently by different users (such as a video service like YouTube or videos available from Google Inc.)

In this way, audio and video data is selectively retrieved by recipe player 320 to allow reuse of substantially similar data in an embodiment of the invention.

8. Conclusion

The Summary and Abstract sections may set forth one or more but not all exemplary embodiments of the present invention as contemplated by the inventor(s), and thus, are not intended to limit the present invention and the claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for composing a recipe comprising:
receiving, at a computer, a first request for a content file, wherein the first request includes a time value;
generating, at the computer, a second request for the recipe based on at least the first request;
generating a byte offset:
corresponding to the time value included in the first request, and used to reference data present in the content file;
generating a header based on the generated byte offset;
composing the recipe, based on at least the second request, including a data structure comprising:
the generated header,
one or more rows, each row including a file identifier and a corresponding content portion range of an identified file, and
at least one or more instructions to compose the content file from a plurality of content sources storing distinct portions of the content file, wherein at least one of the file identifiers is a name used to reference the content file,
generating one or more bytes for at least one corresponding content portion range of the identified file, wherein the one or more bytes correspond to data present in the content file; and
providing the composed recipe to a content delivery node in response to the second request.

2. The method of claim 1, wherein:
generating a header based on the generated byte offset comprises appending the byte offset to the header, and
the name is used to reference the content file.

3. The method of claim 1, further comprising:
verifying the identity of the second request.

4. The method of claim 3, wherein the verifying comprises:
verifying an IP address associated with the second request.

5. A system for reusing data in content files comprising:
a recipe generator, operating on a computer, configured to:
receive, at the computer, a first request for a content file, wherein the first request includes a time value,
generate a second request for the recipe based on at least the first request,
generate a byte offset:
corresponding to the time value included in the first request, and
used to reference a starting byte of a portion of the content file,
compose a header based on the generated byte offset,
compose the recipe, based on at least the second request, including a data structure comprising:
the generated header,
one or more rows, each row including a file identifier and a corresponding content portion range of an identified file, and
at least one or more instructions to compose the content file from a plurality of content sources storing distinct portions of the content file, wherein at least one of the file identifiers is a name used to reference the content file,
generate one or more bytes for at least one corresponding content portion range of the identified file, wherein the one or more bytes correspond to data present in the content file; and
a recipe provider configured to provide the composed recipe to a content delivery node in response to the second request.

6. The system of claim 5, further comprising:
a data store to store data provided by a content provider.

7. The system of claim 5, further comprising:
a client configured to provide or receive data from the recipe based content delivery node.

8. The system of claim 5, wherein the recipe references a recipe continuation.

9. The system of claim 5, wherein the recipe generator comprises:
an identity verifier to verify the identity of a recipe player; and
a byte generator to generate one or more bytes for a recipe.

10. The system of claim 5, wherein the recipe based content delivery node comprises:
a bootstrap identifier generator to generate a bootstrap identifier;
a recipe player to compose one or more content files based on one or more instructions in the recipe; and
a cache to store data that may be reused to compose the one or more content files.

11. The system of claim 10, wherein the boot strap identifier is a URL.

12. The method of claim 1, further comprising:
appending a value of recipe expiry time to the recipe; and
discarding the recipe when the recipe expiry time has elapsed.

13. The method of claim 1, further comprising:
composing a recipe continuation for the recipe, wherein the recipe continuation enables retrieval of data referenced by the recipe continuation to compose the content file.

14. The method of claim 13, further comprising:
appending a reference to the composed recipe continuation to the recipe.

15. A non-transitory computer-readable storage medium having computer-executable instructions stored thereon that, when executed by a computing device, cause the computing device to perform operations for composing a recipe, the operations comprising:
receiving, at the computing device, a first request for a content file, wherein the first request includes a time value;
generating, at the computing device, a second request for the recipe based on at least the first request;
generating a byte offset:
corresponding to the time value included in the first request, and used to reference a starting byte of a portion of the content file;
generating a header based on the generated byte offset;
composing the recipe, based on at least the second request, including a data structure comprising:
the generated header,
one or more rows, each row including a file identifier and a corresponding content portion range of an identified file, and
at least one or more instructions to compose the content file from a plurality of content sources storing distinct portions of the content file, wherein at least one of the file identifiers is a name used to reference the content file,
generating one or more bytes for at least one corresponding content portion range of the identified file, wherein the one or more bytes correspond to data present in the content file; and
providing the composed recipe to a content delivery node in response to the second request.

* * * * *